Feb. 13, 1951    H. M. COOK    2,541,639
ELECTRIC PREHEATER FOR HAIR CURLERS
Filed Feb. 7, 1947
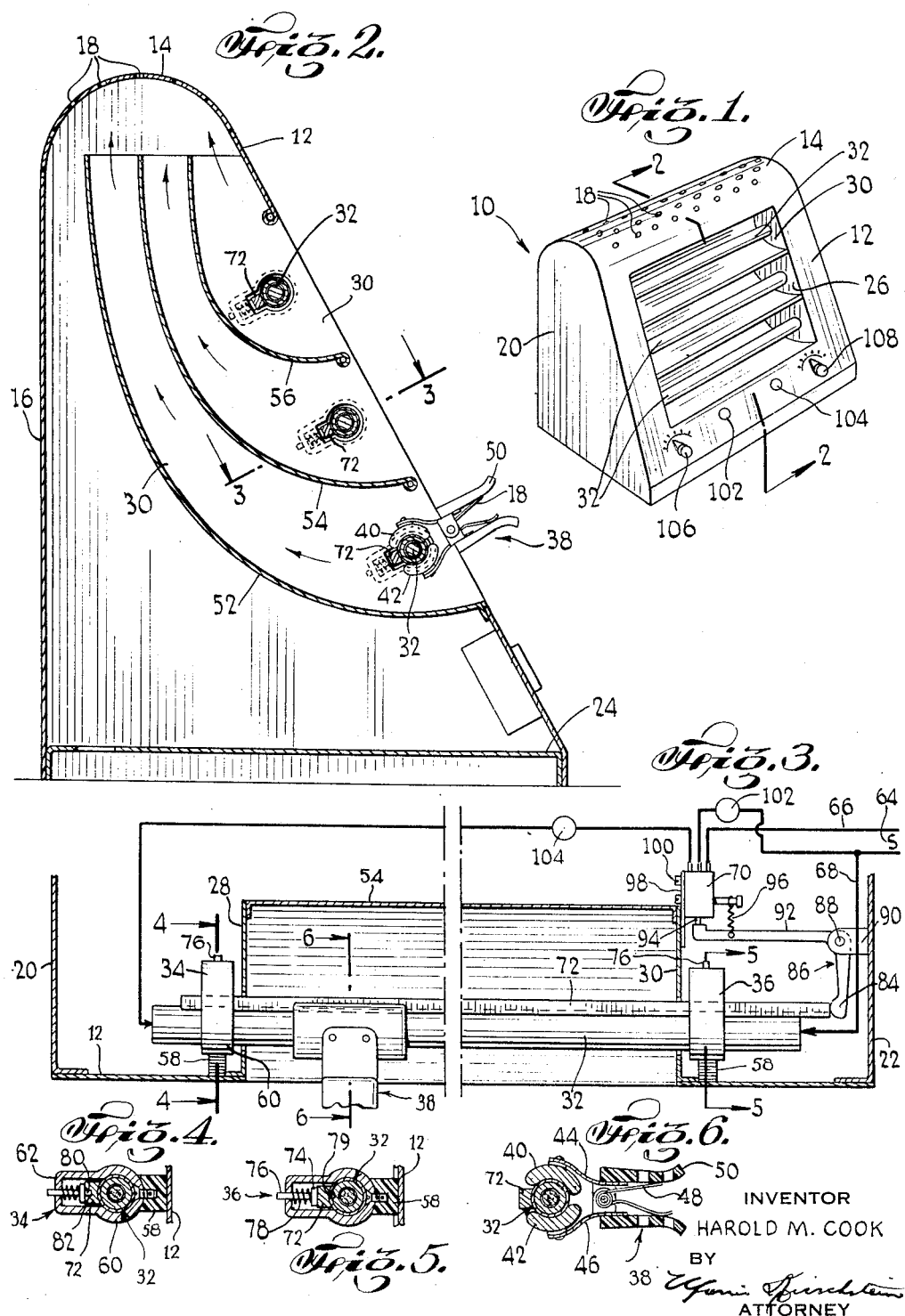
INVENTOR
HAROLD M. COOK
BY
ATTORNEY Patented Feb. 13, 1951

2,541,639

UNITED STATES PATENT OFFICE 2,541,639

ELECTRIC PREHEATER FOR HAIR CURLERS

Harold M. Cook, New York, N. Y., assignor to The Nestle-Le Mur Company, Meriden, Conn., a corporation of Ohio Application February 7, 1947, Serial No. 727,188

4 Claims. (Cl. 219—24)

This invention relates to a method and apparatus for waving hair on the human head. More particularly, the invention pertains to that type of method and apparatus which is shown and described in United States Letters Patent Re. No. 21,994 for Method of Hair Waving, dated January 6, 1942 and United States Letters Patent No. 2,108,964 for Electric Circuit for Hair Waving Machine, dated February 22, 1938, both said patents having been issued to Gotthard Freudenberg and Alfred Edmund Reimers and assigned to the assignee of the instant application.

It is an object of this invention to provide a method and apparatus of the character described which constitute a general improvement over those of the aforementioned patents.

It is a more particular object of this invention to provide an apparatus of the character described which comprises far fewer parts than those illustrated in said patents.

It is a further object of the present invention to provide a method and apparatus of the character described which are easier to use and which give more accurate results than those of said patents.

It is an additional object of the present invention to provide an apparatus of the character described which is so constructed that an operator is not likely to burn her hands thereon.

In the machine illustrated in said patents, heat storage curler heaters are mounted on heating rods whose temperatures are raised electrically, e. g. by resistance heating. The temperatures of the heating rods are controlled by remote thermostatic means which are independently heated by auxiliary electric resistances approximately duplicating temperature conditions of the heater rods. The circuits are such that, when the remote thermostatic means are raised to a certain temperature, energy to the heating rods is cut off, the heating rods being at the desired temperature. Subsequently, when the remote thermostatic means cool down enough, energy will be restored to the heating rods. Thus the heating rods fluctuate between predetermined high and low temperature limits in a desired range, being controlled by a corresponding fluctuation in the temperatures of the thermostatic means.

Although such apparatus has performed satisfactorily in the field, it is relatively expensive to manufacture, due to its many parts and complex electrical circuit. In addition, it has a certain disadvantage, to wit: If a heat storage curler heater is disengaged from a heating rod and subsequently replaced, the temperature of the auxiliary resistance no longer corresponds to or reflects the condition of the heating rod so that, in practice, once a set of heaters has been used, it is customary to permit the associated heating rod to cool off before re-employing the same. This is done to restore the heating rod and the auxiliary resistance to a state approximating starting conditions.

It was also noticed that, where a remote thermostatic means was employed, the temperature of the heating rods could not be controlled any closer than about 60° F. at around 700° F.

It is a more specific object of the present invention to provide an apparatus which does away with the above conditions, that is, which uses few control parts and a simple electrical circuit, which allows heating rods to be re-used without cooling off after the heat storage heaters have been removed therefrom, and which holds the temperature of the heating rods much closer to the desired temperature than heretofore.

Another difficulty experienced with the apparatus of the aforesaid patents is that the heat radiated from the heating rods and curler heaters impinges upon the handles or finger pieces of adjacent heaters making the same so hot that at times they can not be comfortably handled.

It is, accordingly, a further object of the present invention to provide a machine so constructed that each heating rod and its associated heater is prevented from radiating heat to adjacent sets of heating rods and heaters.

Other objects of this invention will in part be obvious and in part hereinafter pointed out.

The invention accordingly consists of the features of construction, combinations of elements and arrangement of parts which will be exemplified in the devices hereinafter described and of which the scope of application will be indicated in the appended claims.

In the accompanying drawings, in which is shown one of the various possible embodiments of this invention, Fig. 1 is a perspective view of a hair waving apparatus constructed in accordance with the invention;

Fig. 2 is an enlarged sectional view therethrough, taken substantially along the line 2—2 of Fig. 1;

Fig. 3 is a sectional view taken substantially along the line 3—3 of Fig. 2, and Figs. 4, 5 and 6 are sectional views taken substantially along the lines 4—4, 5—5 and 6—6, respectively, of Fig. 3.

Referring now in detail to the drawings, 10 indicates a machine embodying the invention and commonly known in the trade as "preheater machine." Said machine comprises a cabinet including an inclined front wall 12, a curved top wall 14 and a rear wall 16 all optionally constructed from a single piece of sheet metal. The top wall has several through openings 18 provided therein so that it can act as a grille. Side walls 20, 22 are suitably secured, as by spot welding, to the front, top and rear walls. If desired, the bottom of the cabinet may be closed by a base plate 24.

The front wall has a large opening 26 from whose side edges plates 28, 30 extend rearwardly into the interior of the cabinet. Said front wall serves as the support for a plurality of cylindrical heating rods 32 extending through the plates 28, 30 and bridging the space therebetween. For the sake of appearance, the heating rods are arranged parallel to one another and to the base of the cabinet, and in addition are spaced approximately the same distance in back of the front wall. The heating rods are supported from the front wall by brackets 34, 36 of a special construction hereinafter described in detail, and said rods are adapted to have clamped thereon a plurality of heat storage curler heaters 38 of conventional construction. These latter, by way of example, comprise two curved heat storage jaws 40, 42 riveted to arms 44, 46 which are pivotally secured together. A spring 48 biases the jaws toward one another. Finger pieces 50 are riveted to the arms 44, 46.

Each of the heating rods has disposed beneath and in back of it a curved plate 52, 54, 56 the forward edge of which is in approximately the plane of front wall 12 and the rear edge of which is located a short distance beneath the top wall 14. Said plates turn through an angle of about 90° between these two walls of the cabinet and form separate passageways each of which runs from the opening 12 to the grille past a single heating rod. The edges of the curved plates 52, 54, 56 may be connected to the side plates 28, 30 to provide fully closed chimneys each of which comprises one of the foregoing passageways and houses a heating rod near its open lower end. Said chimneys act to intercept heat radiated from the heating rods and which would normally strike the finger pieces of heaters on adjacent heating rods. The chimneys also serve to induce the flow of a stream of air past the heating rods and heaters. This air, coming as it does from the room, is relatively cool and will tend to hold down the temperature of the finger pieces so that the same may at all times be handled with comfort.

The brackets 34, 36 which support the heating rods 32 comprise straps bolted to blocks 58 of insulating material on the front wall 12. Said straps each include an internally concave, segmentally circular portion 60 of proper diameter to slidably receive the heating rods. It will be understood that the shape of these portions 60 is controlled by the cross-section of the ends of the heating rods, the same being of such outline as to freely receive said ends. The ends of the portion 60 run into the legs of a U-shaped part 62.

The heating rods derive electric energy from a suitable source 64 of power supplied through lead lines 66, 68. Pursuant to a feature of the present invention, one of these lead lines, as for example, the lead line 66, is interrupted by a series connected switch 70 which may be of the momentary snap acting type such as are sold under the trade names Micro switch or Mu switch. Thermostatic means directly responsive to the temperature of the heating rod is employed to govern the operation of said switch in such manner that, when the heating rod is below a predetermined temperature, the circuit to said rod remains closed as long as the machine is in operation and, when the heating rod is above another predetermined temperature, the switch will open.

Said thermostatic means consists of an elongated bar 72 which, in the illustrated example, is of metal. The bar is in physical contact with the heating rod and, as a matter of fact, may have one face thereof concavely grooved so as to maintain contact with the rod over an extensive area. The two ends of the bar are received between the legs of the U-shaped portions 62 of both brackets 34, 36 so that the bar is situated in a definite position which insures contact of the bar and heating rod.

Means also may be included to press the bar against the rod. Said means constitutes spring loaded pressure pads carried by each of the brackets and pressing the bar 72 against the heating rod. Each pad is in the form of a small metal disc 74 bearing against the back side of the bar 72, said disc being integrally secured to one end of a pin 76, slidably mounted in the base of the U-shaped portion 62. A small compression spring 78 encircling the pin is caught between the base of the U-shaped portion 62 and the disc 74 whereby to press the disc up against the bar 72 and the bar, in turn, against the heating rod. The rod 32 may be restrained against axial movement by a boss 79 on the bar fitted into a depression in the rod.

The bar 72 is employed as a thermally sensitive member by fixing one end thereof against movement and arranging the position of the other end to control the operation of the momentary switch 70. Accordingly, one of the discs, as for instance, the disc in the bracket 34, has a projection 80 on the face opposite that from which the pin 76 extends. Said projection is received in a recess 82 on the back surface of the rod 72. The opposite end of said bar butts against an arm 84 of a bell crank lever 86 rotatively mounted in the cabinet 10 by means of a pin 88 and bracket 90. The other arm 92 of said bell crank lever bears against the actuating finger 94 of the switch 70. Said switch is of the normally open type but is kept closed, when the machine is idle, by a tension spring 96 which presses the arm 92 against the finger 94 strongly enough to close the switch contacts.

The switch 70 is secured in the cabinet in some suitable manner. For instance, it may be mounted on a metal strip 98 which is secured to the plate 30. The mounting of said switch or of the bracket 90 is adjustable in order that the temperature at which the switch is operated may be varied. As illustrated, the mounting for the switch is made adjustable, the strip 98 having slots therein extending in a direction toward and away from the bar 72, and the switch being fixed to the strip by screws 100.

In operation, when power is turned on, the rod 32 will heat up and the temperature of the bar 72 will be substantially the same as that of the rod inasmuch as it is in extensive contact therewith. As the temperature of the bar rises, the position of its fixed end in the bracket 34 will remain unchanged. However, the far end thereof adjacent the bracket 36 will move away from the fixed end due to expansion of the metal. This causes the bell crank lever to rotate in a counter-clockwise direction against the action of the spring 96. The position of the switch 70 is so adjusted that when the rod 32 reaches a certain desired temperature, say 700° F., said switch is in such condition that it will just have opened. Under these circumstances, power will be cut off to the rod and the bar 72 will contract. The arm 84 of the bell crank lever now will follow the rod under the influence of the spring 96 and the arm 92 of said lever will depress the actuating finger 94. When the temperature of the bar has dropped a relatively slight amount, for instance, 30° or less, the arm 92 will have moved sufficiently to operate the switch 70 and close its contacts thus re-energizing the rod. This cycle continues until the storage heaters are removed from the rod. If, now, fresh heaters are placed on the rod, the temperature of the rod will rapidly drop, but as soon as this occurs the bar 72 will likewise experience a loss of heat, and its temperature will fall causing the switch 70 to close and to remain closed until such time as the rod, the bar and the heaters on the rod have attained the proper temperature.

It is pointed out that the momentary switch 70 includes its own means for spring loading the same to idle position as is customary in the art. That is to say, said switch includes a resilient member which biases the two switch contacts apart. This member also biases the actuating finger to its outermost position, and thus the preheater need include no additional means for linking together said actuating finger and the arm 92 of the bell crank lever. The snap action of the switch minimizes sparking when the contacts open.

Although momentary switches, and particularly those of the snap action type, such as is exemplified by a Micro-Switch, are very sensitive and operate upon tiny movements of the actuating finger so that they can control the temperature of the rod 32 very closely, this sensitivity may be enhanced simply by making the switch actuating arm 92 longer than the rod actuated arm 84. With such construction it is extremely simple to keep the temperature of the rod within a 30° F. range at a temperature of about 700° F.

A single thermostat such as described may be used to govern the operation of all three heating rods, this being the form herein illustrated. However, it is also within the scope of the invention to provide a direct contact thermostat for each of the rods.

In the instant case only the central rod has a thermostat. However, the upper and lower rods also have bars 72 substantially identical with the bar on said center rod in order that the heat storage capacity of the upper and lower rods will be substantially the same as the heat storage capacity of the central rod. It is pointed out that all said bars are slender enough to permit the heaters to be clamped on the rods.

The machine may include the usual adjuncts employed with preheaters. Thus, two lights 102, 104 can be provided on the front of the panel. One of these lights, e. g. the light 102, is green and is energized through auxiliary normally closed switch contacts when the main contacts of the switch 70 which control the heating circuit are open. The other light 104 is red. This light is energized when the heating circuit is in operation. Thus, when the red light is lit it serves as a signal to inform the operator that the machine is in operation but that the rods are not at proper temperature. When the green light is lit the operator knows that the clamps can be removed and applied to person's hair.

The front wall 12 also has mounted thereon two elapsed time clocks 106, 108. One of these clocks, for instance the clock 106, controls a switch (not shown) in the power leads 66, 68. Cocking the clock 106 closes said switch and passage of the predetermined period of time opens said switch. This prevents the machine from operating over too long a period and makes certain that the operator does not leave the machine running when not actually in use. The other elapsed time clock 108 rings a bell after a predetermined period to inform the operator that the heaters have been left long enough on a head of hair.

It will thus be seen that there is provided a machine which accomplishes the several objects of the invention and is well adapted to meet the conditions of practical use.

As various possible embodiments might be made of the above invention and as various changes might be made in the embodiment above set forth, it is to be understood that all matter herein described or shown in the accompanying drawings is to be interpreted as illustrative and not in a limited sense.

Having thus described the invention, there is clamied as new and desired to be secured by Letters Patent:

1. An electrical apparatus for preheating heat storage curler heaters to be used for permanently waving hair on the human head, said apparatus comprising at least one heating element on which the heaters are adapted to be clamped, said heaters being so constructed that the edges thereof are spaced apart when clamped on the heating element, means to support said element, an electric heating means within said element, an electric supply circuit connected to said heating means, an electric switch in the supply circuit, an elongated thermally expansible member separate from and slenderer than said element and exposed to the ambient air, means to mount said member in back of said element and in direct contact therewith substantially over their full lengths, means to hold a portion of said member adjacent an end thereof against axial movement, said member being slender enough to be disposed between the jaws of the heaters clamped on the heating element, and a means kinematically interconnected said elongated member adjacent its other end to said switch in such fashion that said switch is opened by said member when said element exceeds a predetermined temperature and is closed by said member when said element is below a certain temperature.

2. An electrical apparatus as set forth in claim 1 wherein means is provided to resiliently press said elongated member against said element at a plurality of spaced points.

3. An electrical apparatus as set forth in claim 2 wherein the electric switch is a momentary switch.

4. An electrical apparatus as set forth in claim 3 wherein the kinematic interconnecting means includes a motion-amplifying means.

HAROLD M. COOK.

(References on following page)

REFERENCES CITED

The following references are of record in the file of this patent:

UNITED STATES PATENTS

| Number | Name | Date |
|---|---|---|
| 1,689,004 | Ackley | Oct. 23, 1928 |
| 1,699,405 | Pfau | Jan. 15, 1929 |
| 1,701,096 | Bowling et al. | Feb. 5, 1929 |
| 1,884,232 | Rehm | Oct. 25, 1932 |
| 1,972,186 | Davis | Sept. 4, 1934 |
| 1,980,475 | Davis | Nov. 13, 1934 |
| 2,112,731 | Bruning et al. | Mar. 29, 1938 |
| 2,201,115 | Reingruber et al. | May 14, 1940 |
| 2,420,352 | Burung | May 13, 1947 |

FOREIGN PATENTS

| Number | Country | Date |
|---|---|---|
| 221,875 | Switzerland | June 30, 1942 |
| 452,774 | Great Britain | Aug. 25, 1936 |